United States Patent [19]

Dahlstrom et al.

[11] 4,147,756
[45] Apr. 3, 1979

[54] COMBUSTION GAS SCRUBBING SYSTEM

[75] Inventors: Donald A. Dahlstrom, Salt Lake City, Utah; William Ellison, Lebanon, Pa.; James H. Wilhelm, Sandy, Utah

[73] Assignee: Envirotech Corporation, Menlo Park, Calif.

[21] Appl. No.: 675,364

[22] Filed: Apr. 9, 1976

[51] Int. Cl.² .......................................... C01B 17/00
[52] U.S. Cl. ....................................... 423/242; 55/71; 55/73; 55/85; 55/228; 422/169
[58] Field of Search ...................... 55/71, 73, 85, 228; 423/240, 242; 23/284

[56] References Cited

U.S. PATENT DOCUMENTS

| | | | |
|---|---|---|---|
| 2,301,779 | 11/1942 | Herold et al. | 55/71 |
| 3,632,305 | 1/1972 | Hardison | 423/242 |
| 3,808,321 | 4/1974 | Fukuiet et al. | 423/242 |
| 3,834,129 | 9/1974 | Darlinger et al. | 423/242 |
| 3,911,084 | 10/1975 | Wall et al. | 423/242 |
| 3,919,392 | 11/1975 | Teller | 423/242 |
| 3,935,296 | 1/1976 | Morita et al. | 423/242 |
| 3,958,961 | 5/1976 | Bakke | 55/71 |

*Primary Examiner*—Bernard Nozick
*Attorney, Agent, or Firm*—Robert E. Krebs; Thomas S. MacDonald

[57] ABSTRACT

In a cooperative combination of two scrubbing systems, the first scrubbing system operates upon combustion gases with an aqueous solution to remove hydrogen chloride gas and other chlorine components. The second scrubbing system subsequently operates upon the combustion gases with a sodium-base solution to absorb sulfur oxides. The products of the two scrubbing systems are treated in combination to form a material for disposal and to generate the aqueous scrubbing solution for the chloride scrubbing system.

23 Claims, 1 Drawing Figure

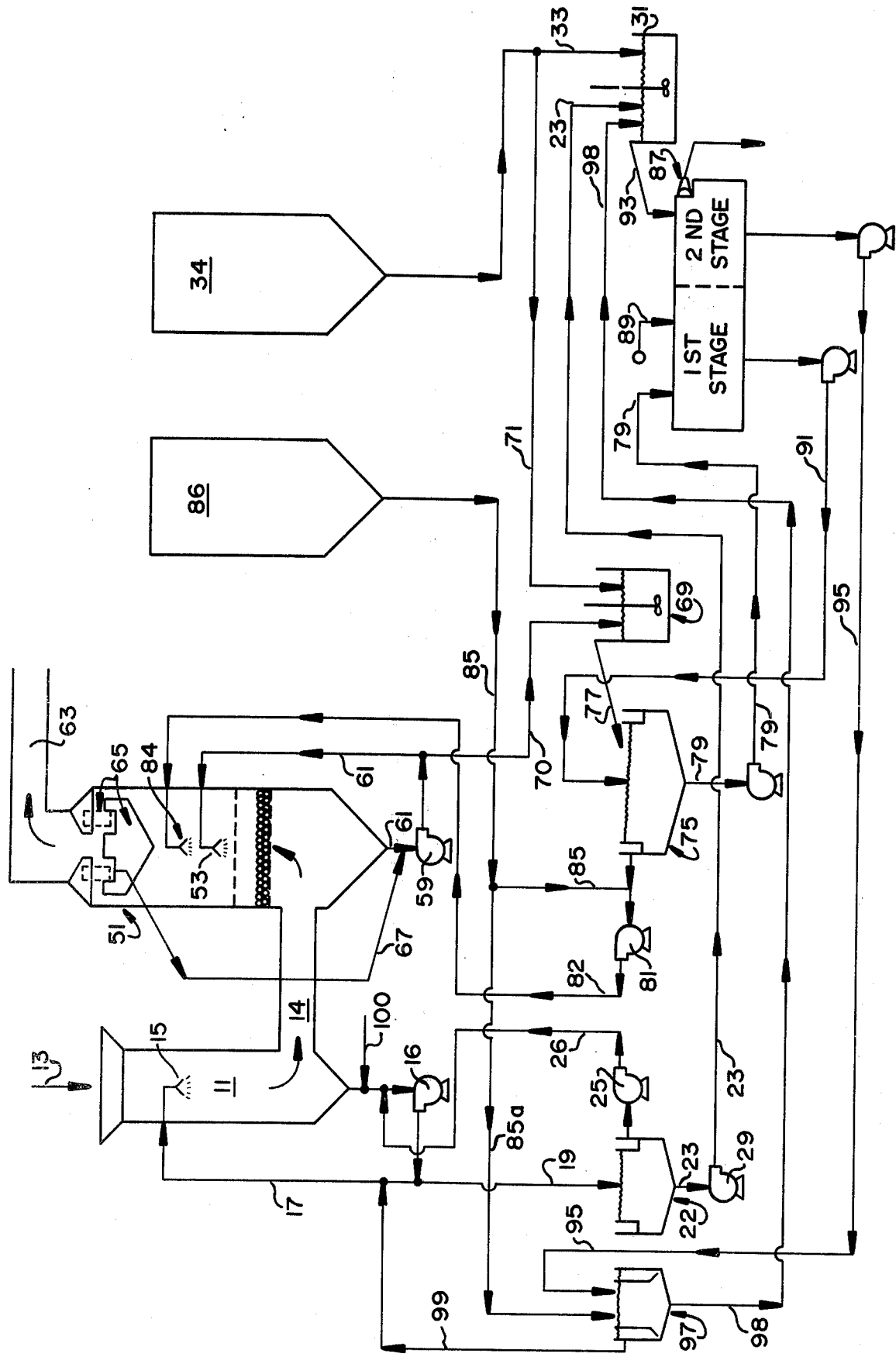

COMBUSTION GAS SCRUBBING SYSTEM

BACKGROUND OF THE INVENTION

1. Field of the Invention

This invention generally relates to a process and system for removing sulfur oxides such as sulfur dioxide from gases by scrubbing with an aqueous sodium-base solution, where the gases result from a combustion process employing a fuel which has appreciable chlorine content.

2. State of the Art

To protect the environment and public health, it has been established that industry should limit the concentration of sulfur oxides released to the atmosphere as the result of combustion processes. Control of sulfur oxide emissions is, however, difficult to accomplish under circumstances where it is necessary that the control system operate dependably enough to not interfere with the combustion process itself. For example, electric power generating plants are obligated to control sulfur oxide emissions from their coal-fired boilers, but must do so in a manner which will not interrupt power generation.

A number of techniques have been proposed to remove sulfur dioxide from combustion gases. One well known technique is the so-called "limestone scrubbing" process wherein combustion gases are scrubbed with an aqueous slurry containing calcium in solution derived from the partial dissolving of limestone. When combustion gases containing sulfur oxides are scrubbed with such a slurry, the calcium ions ultimately react with the sulfur oxides to some degree in the scrubber to form relatively insoluble products, principally calcium sulfate and sulfite, which can thereafter be separated from the scrubbing slurry by filtration or sedimentation techniques or combinations of both. A disadvantage of such limestone scrubbing systems is the risk, especially during periods of equipment malfunction, of inadvertently forming large deposits of insoluble materials in the scrubbing equipment. Such deposits, called scale, can irreparably foul the scrubbing system and associated piping.

To avoid the aforementioned risks, workers in the art have proposed the use of sodium-base scrubbing solutions. In these systems, combustion gases are scrubbed with solutions containing sodium hydroxide and/or sodium sulfite. These solutions react with sulfur dioxide to form sodium bisulfite, a soluble compound which does not cause scale. A number of processes have been proposed to reactivate the scrubbing solutions by treatment with an inexpensive alkali substance such as lime or limestone to recover the relatively more expensive sodium values and to convert the collected sulfur oxides to a solid form for ready disposal. In such regeneration processes, solid calcium sulfite and sulfate particles are formed and, at the same time, the sodium sulfite and/or hydroxide concentration of the solution is increased at the expense of sodium bisulfite. Typically, the calcium-bearing solid particles are separated from the regenerated solution and discarded.

An early sodium-base scrubbing process is suggested in U.S. Pat. No. 1,271,899 to Howard; according to that patent, a sodium bisulfite solution which resulted from the scrubbing of flue gas is reacted with lime to precipitate calcium sulfite and to regenerate sodium hydroxide. Anothe process of this type is suggested in U.S. Pat. No. 3,697,033; according to that patent, a solution of sodium sulfite and bisulfite resulting from the scrubbing of combustion gases is sequentially treated with limestone and then lime in order to precipitate calcium sulfite and sulfate and to regenerate the sodium-base scrubbing solution. Still another example of a sodium-base scrubbing process can be found in U.S. Pat. No. 3,772,532 to Dahlstrom and Cornell. Yet another example can be found in U.S. Pat. No. 3,911,084; the process proposed in that patent includes a pretreatment step wherein gases are cooled to below 500° F. and the bulk of larger particulates are removed.

SUMMARY OF THE INVENTION

The system of this invention is particularly intended to operate upon combustion gases which result from the burning of coal which has a high chlorine content. Coal is generally characterized as having a high chlorine content when it contains about 0.04% or more chloride by weight. The system of the invention is especially advantageous when the coal being burned contains about 0.10% or more chloride by weight.

Although the form in which chlorine occurs in coal is not precisely known at this time, it is believed to be present as sodium chloride, magnesium chloride, potassium chloride, organic chloride, oxychlorides of calcium and magnesium, and in forms combined with organic matter. Upon combustion, chloride components are evolved as chlorine gas and hydrogen chloride, with the latter form usually predominating.

In a cooperative combination of two scrubbing systems, the first scrubbing system operates upon combustion gases with an aqueous solution to remove hydrogen chloride gas and other chlorine components. The second scrubbing system subsequently operates upon the combustion gases with a sodium-base solution to absorb sulfur oxides. The products of the two scrubbing systems are treated in combination to form a material for disposal and to generate the aqueous scrubbing solution for the chloride scrubbing system.

Various advantages of the present invention can be readily ascertained by reference to the following description and appended schematic drawing, labeled FIG. 1, which are offered by way of illustration only and not in limitation of the invention, whose scope is defined by the appended claims and equivalents to the structure, materials and acts recited therein.

DETAILED DESCRIPTION OF THE PREFERRED EMBODIMENT

Referring to FIG. 1, the chloride scrubbing system includes a scrubbing device 11 connected to receive, via an inlet conduit 13, gases resulting from a combustion process employing a high-chloride fuel. Prior to entering the chloride scrubbing system, the combustion gases are preferably passed through an electrostatic precipitator or any other type of dry collector which removes entrained particulates, principally fly ash, from the gases.

In the scrubbing device 11, the combustion gases are intimately contacted with an aqueous scrubbing solution which absorbs chloride components, principally hydrogen chloride, from the gases. This scrubbing stage not only removes chlorides and reduces the acid-gas vapor pressure but removes various other contaminants from the combustion gases. The removed contaminants normally include some fly ash and, more importantly, iron and other heavy metal substances that would catalytically intensify oxidation in the subsequent sulfur dioxide scrubbing system. The other heavy metal substances include arsenic, beryllium, cadmium, chromium, cobalt, copper, mercury, lead, selenium and zinc. Unless removed, such contaminants could deleteriously interfere with sulfur dioxide absorption in the above-mentioned second scrubbing system.

In the illustrated embodiment, the gas inlet 13 is connected in communication with the upper end of the housing of the scrubbing device and the introduced gases flow downward therefrom to an outlet conduit 14. The scrubbing liquid is discharged in the housing by means such as spray nozzles 15 and flows downwardly cocurrent with the gas flow. At the bottom of the housing, the scrubbing liquid is collected and is pumped back to the spray nozzles 15 via a pump 16 and a recirculation conduit 17. The scrubbing device could alternatively comprise any one of a number of well known and commercially available wet-type scrubbing units wherein liquid-gas contact is accomplished either countercurrently or cocurrently.

According to the present invention, a portion of the circulating scrubbing solution is continuously diverted from the scrubbing device and passed into a treatment system that will be described in the following. In the illustrated embodiment, the diverted solution is carried by a conduit 19 which is connected to the recirculation conduit 17. The percentage of the scrubbing solution which is diverted is typically less than about 10% but this is largely a matter of choice subject to certain constraints that will be mentioned later herein.

The treatment system preferably includes a settling tank 22 which receives the effluent liquid from the conduit 19 and holds that liquid in a generally quiescent state so that suspended solids separate from the liquid phase by sedimentation. Preferably, the tank 22 is covered to contain gases and vapors. This settling stage functions to limit the suspended solids, such as fly ash, which are carried in the chloride scrubbing system. Preferably, the chloride scrubbing solution should contain no more than about 0.1% to 1% suspended solids by weight. Sediment, in the form of an aqueous slurry, is discharged from the settling tank 22 through underflow conduit 23. The percent solids in the underflow is not critical and could range from about 0% to over 60%. Typically, the slurry has a pH of less than about pH 2; the acidity of the slurry is apparently due to the presence in solution of hydrochloric acid and sulfuric acid absorbed from the combustion gases.

Liquid not removed from the settling tank 22 as underflow slurry is removed as clarified supernatant liquid. In the illustrated embodiment, the clarified liquid is returned directly to the scrubbing device via a pump 25 and a conduit 26. The underflow slurry is passed through conduit 23 to a neutralization stage which will now be described. The apportionment between the fraction of influent liquid which is removed from the tank 22 as underflow and the fraction which is removed as clarified liquid is a matter of choice, subject to wash ratio constraints which will be explained later herein. In fact, the settling tank 22 could be omitted; that case would correspond to the removal of 100% of the influent liquid as underflow.

The illustrated neutralization stage includes a continuous stirred-tank reactor 31 which receives the underflow slurry from the settling tank 22 pumped through the conduit 23 by a pump 29. The reactor also receives a neutralizing agent, such as lime or limestone, via a feed line 33 from a storage source 34. The following are the principal reactions which occur as the neutralizing agent is mixed with the underflow slurry in the reactor:

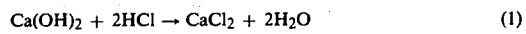
$$Ca(OH)_2 + 2HCl \rightarrow CaCl_2 + 2H_2O \tag{1}$$

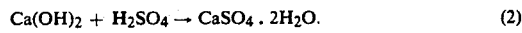
$$Ca(OH)_2 + H_2SO_4 \rightarrow CaSO_4 \cdot 2H_2O. \tag{2}$$

As a result of these reactions, treated liquid in the reactor 31 contains dissolved calcium chloride as well as fly ash and other suspended solids. The amount of neutralizing agent which is supplied at this stage should be sufficient to raise the treated liquid to at least between pH 2.0 and 7, preferably, to between pH 5 and 6.

According to the present invention, treated liquid from the neutralization stage is utilized as a final "washing" solution for solids which are the product of a sulfur dioxide scrubbing system. The following is a description of the illustrated sodium-base sulfur dioxide removal system. It should be understood, however, that this system is offered by way of example only and that other embodiments of the system can be utilized in accordance with the present invention.

The illustrated sulfur dioxide removal system generally comprises a scrubber 51 connected to receive, via the conduit 14, the gases treated by the chloride scrubbing system. In the scrubber 51, the gases are intimately contacted with an aqueous sodium-base scrubbing solution which absorbs sulfur dioxide and further removes particulates from the gases. The sulfur dioxide removal system also generally includes a regeneration subsystem which continuously receives a portion of the sodium-base scrubbing solution and regenerates the same. In the regeneration subsystem, the scrubbing solution is reacted with a calcium alkali compound such as calcium hydroxide or calcium oxide to regenerate the active components of the scrubbing solution and to concomitantly precipitate solid sulfur-containing compounds, such as calcium sulfite and sulfate, from the scrubbing solution. The sulfur dioxide scrubbing system still further includes a filtration subsystem which receives the regenerated scrubbing solution and operates to separate suspended solids therefrom before the solution is returned to the scrubber 51. The separated solids are usually discarded; however; they could be further treated to produce a structural product.

The scrubber 51 is illustrated as being of the wetted perforated tray type. The conduit 14 is connected in communication with the bottom of the scrubber housing and the gas introduced there flows upward through the trays which contain mobile packing elements such as reticulated hollow spheres. The scrubbing liquid is discharged in the scrubber housing by liquid outlet means 53, such as conventional splash plates, and flows downward countercurrent to the gas flow. The scrubbing solution is collected at the bottom of the housing and is pumped therefrom, via a pump 59 and a recirculation conduit 61, back to liquid outlet means 53. The scrubbed gases, substantially free of sulfur dioxide and entrained particulates, are discharged through an outlet conduit 63 at the top of the housing. The gases are then released to the atmosphere, either directly or via a stack. It should be understood that the design and structure of the scrubbing device 51 is well known and does not constitute a part of the instant invention; the scrubber 51 could alternatively comprise a venturi scrubbing device, a spray tower, or a perforated-plate type of liquid-gas contacting device.

The illustrated scrubber 51 further includes an integral mist eliminating device 65 which removes liquid droplets which have become entrained as the gas stream passes through the housing. The mist elminating device is conventional and could alternatively be interposed in the outlet conduit 63 external to the scrubber. Liquid captured by the mist eliminator 65 is conveyed, via a line 67, to the recirculation conduit 61 for mixing with the scrubbing solution therein. It should be understood that the point of usage of the mist eliminator liquid is a matter of choice and the liquid could be utilized elsewhere in the system; for example, when the mist eliminator is periodically washed with water, the solution can be returned to the chloride scrubber 11 during the washing period to aid in maintaining a water balance in the system.

The reactions whereby sulfur oxides are absorbed by the sodium-base solution in the scrubber 51 are believed to be described by the first four equations below. The first two equations describe the absorption of sulfur dioxide and trioxide and the fact that the resultant solution is a buffer system of sulfureous acids. The third equation describes the neutralization by sodium sulfite of acids arising from absorption of the sulfur dioxide and trioxide values. Depending upon the pH of the scrubbing solution, sodium hydroxide can be present to various degrees and will react with sulfur dioxide as shown in the fourth equation below.

$$SO_2 + H_2O \rightarrow 2H^+ + SO_3^= \qquad (1)$$

$$SO_3 + H_2O \rightarrow 2H^+ + SO_4^= \qquad (2)$$

$$2H^+ SO_3^= + Na_2SO_3 \rightarrow 2NaHSO_3 \qquad (3)$$

$$2NaOH + SO_2 \rightarrow Na_2SO_3 + H_2O \qquad (4)$$

$$Na_2SO_3 + \tfrac{1}{2}O_2 \rightarrow Na_2SO_4. \qquad (5)$$

The fifth equation above describes an oxidation reaction whereby sodium sulfate is formed from sulfite. In sodium-base scrubbing systems, it is usually desirable to limit oxidation because it increases sodium sulfate concentration in the scrubbing solution and, hence, increases sodium losses from the system since sodium sulfate is more difficult to regenerate than is sodium sulfite.

One effect of sulfur dioxide scrubbing is to lower the pH of the scrubbing solution. Assuming that the scrubbing solution is about pH 6.5 upon entry to the scrubber 51, the solution would typically drop to as low as about pH 5 after contact with the combustion gases. In the illustrated system, the scrubbing solution preferably has a pH ranging from about 7 to about 6 prior to entering the scrubber; however, the system could operate with scrubbing solutions ranging from about pH 5.5 to about pH 8.

It should also be understood that the preceding reactions describe equilibrium situations and that none of the reactions go to final completion. In other words, the sulfite-to-bisulfite ratio in the scrubbing solution after contact with the combustion gases is lower than the ratio prior to contact, but is not zero.

The products of interest in the scrubbing reactions are sodium bisulfite and sulfate, which products are substantially inactive in the sense of being unable to absorb sulfur dioxide. To re-form the sodium sulfite and/or hydroxide coponents of the scrubbing solution as active alkali and to reduce the concentration of sodium bisulfite and sulfate, a regeneration subsystem is provided as described in the following.

The illustrated regeneration subsystem includes a reaction device 69 which receives, via a conduit 70 connected to the recirculation conduit 61, a diverted portion of the circulating scrubbing solution. Typically, the diverted stream comprises about 30% to about 3% of the total circulating flow. In the reaction device 69, the diverted scrubbing solution is mixed with a calcium compound, such as lime. The reaction device 69 is illustrated as a continuous stirred-tank reactor; a battery of such reactors can, of course, be employed. Also, various other well known types of chemical reactors can be utilized here.

The reactions which occur in the reaction device 69 are believed to be described by the following three equations wherein slaked lime, $Ca(OH)_2$ is assumed to be the reactant. The first equation describes a regeneration reaction whereby slaked lime reacts with dissolved sodium bisulfite to regenerate sodium sulfite and to form calcium sulfite precipitate. The second equation describes the regeneration of sodium hydroxide and the formation of calcium sulfite precipitate when slaked lime reacts with sodium sulfite. The third equation describes the formation of calcium sulfate precipitate when slaked lime reacts with sodium sulfate; the extent of completion of that reaction depends upon various equilibrium relationships and, generally speaking, calcium sulfate is difficult to precipitate because it is relatively soluble as compared to calcium sulfite. Although the calcium sulfite and sulfate components are referred to as precipitates, they will be physically suspended in the regenerated scrubbing solution either separately or in co-precipitated combined form.

$$Ca(OH)_2 + 2NaHSO_3 \rightarrow CaSO_3 + Na_2SO_3 + 2H_2O \qquad (1)$$

$$Ca(OH)_2 + Na_2SO_3 \rightarrow CaSO_3 + 2NaOH \qquad (2)$$

$$Ca(OH)_2 + Na_2SO_4 \rightarrow CaSO_4 + 2NaOH \qquad (3)$$

The regeneration subsystem further comprises liquid-solids separation equipment which, in the illustrated embodiment, includes a settling tank 75 which receives, via a conduit 77, the effluent from the reaction device 69 and holds that effluent in a generally quiescent state so that solids are settled from the liquid phase. The settled solids, in the form of an aqueous slurry, are discharged as underflow from the settling tank 75 through conduit 79. Typically, the underflow slurry contains at least about 25% to 30% solids by weight and has alkalinity ranging from about pH 9 to about pH 12. The alkalinity of the slurry comprises the presence of sulfite and hydroxide ions in solution. Normally, at least about 10% of the influent to the settling tank 75 is removed therefrom as underflow slurry; the remainder is removed as decanted liquid via launders or the like decanting means.

In the illustrated system, the decanted liquid from the settling tank 75 is carried to the scrubber 51 via a pump 81 and a conduit 82 and is introduced into the scrubber 51 through means 84 located intermediate the aforementioned liquid outlet means 53 and mist eliminating device 65; the returned liquid could, of course, be introduced at other locations. To make up for sodium losses in the sulfur dioxide scrubbing system, soda ash ($Na_2CO_3$) is added to the returing liquid through a conduit 85 which connects a sodium source 86 to the conduit 82.

Normally, this makeup sodium has no significant effect on pH. The soda ash could be added at alternative points in the system, such as in the reaction device 69. The aforementioned filtration separation subsystem is here shown as including a single horizontal belt vacuum filter 87 which receives the underflow slurry from the settling tank 75 via the conduit 79. According to the present invention, the filtration subsystem has at least two separate and distinct filtration stages; thus, the illustrated vacuum filter 87 is shown as having integral "first" and "second" filtration stages. The filter 87, sometimes called an "extractor" by workers in the art, is a well known and commercially available device; alternatively, the filtration subsystem could include centrifuges, rotary drum vacuum filters or various other well known filtering units.

The function of the first filtration stage is to form a moist cake of solids from the slurry produced in the sulfur dioxide scrubbing system (i.e., the slurry received from the settling tank 75). Preferably, first stage filtration is accomplished with a fresh water wash, as designated by line 89, at wash ratios of say about 0.6 to about 1.2; it may be noted that since the concentration of chlorides in the cake of solids is low, the fresh water wash can be accomplished without the danger of high concentrations of chlorides being carried back into the sulfur dioxide scrubbing system. In the illustrated embodiment, filtrate from the first filtration stage is returned to the settling tank 75 via a conduit 91; however, the filtrate could be discharged to other points in the sulfur dioxide scrubbing system. The cake of solids formed in this first filtration stage typically contains about 40-50% moisture and has a pH of about 9 to 12. Invariably, there is some sodium dissolved in the moisture carried by the cake of solids, largely in the form of sodium sulfite. A typical concentration for the dissolved sodium sulfite is perhaps 0.5 molar before washing.

According to the present invention, the treated solution from the neutralization stage in the chloride scrubbing system (i.e., the effluent slurry from the reactor 31) is utilized in the second filtration stage of the abovementioned filtration subsystem as a washing solution for the cake of solids formed in the first stage. In the illustrated embodiment, the treated solution is conveyed to the filter 87 from the reactor 31 by a conduit 93. Preferably, the wash ratio at this second filtration stage ranges from about 0.4 to about 1.2, where a wash ratio is defined as the volume of the washing solution per unit volume of surface moisture in the filter cake prior to washing.

Generally speaking, there are three results from this washing step in the second filtration stage. First, because the treated liquid from the neutralization stage in the chloride scrubbing system contains appreciable dissolved calcium chloride, a chemical reaction occurs when the washing solution contacts dissolved sodium sulfite in the cake of filtered solids. The reaction is:

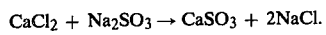
$$CaCl_2 + Na_2SO_3 \rightarrow CaSO_3 + 2NaCl.$$

The result of the reaction is the formation of calcium sulfite solids in the filter cake. This reaction can also be understood to be a softening step which lessens the calcium hardness of the washing solution. (Further, it may now be understood that the purpose of the neutralization stage in the chloride scrubbing system is to prevent leaching of the filter cake by acids, such as hydrochloric and sulfuric, dissolved in the chloride washing solution.)

A second result of the second stage washing step is to collect solids from the washing solution in the filter cake. That effectively purges the chloride scrubbing system of suspended solids and the aforementioned substances which could catalytically encourage oxidation if carried into the sulfur dioxide scrubbing system.

A third result of the washing step is to replace surface moisture in the filter cake with liquid from the washing solution. This result is usually called "displacement." The displaced moisture leaves the second filtration stage as substantially solids-free filtrate via a conduit 95; the portion of the washing solution which displaces the initial surface moisture in the filter cake is discarded from the system with the filter cake. It should be recognized that the washing solution has a greater chloride ion concentration than the displaced moisture. Thus, the net effect of the washing step is to exchange the high chloride washing solution for a filtrate which has a reduced chloride concentration. This exchange is accomplished without substantially increasing the moisture content of the filter cake. The sodium component of the filtrate from the second filtration stage, which sodium is "reclaimed" from the cake of solids by the displacement wash, is beneficially utilized in the chloride scrubbing system as will be described hereinafter.

We have found that high displacement efficiencies can be obtained in the second-stage washing step. (Displacement efficiency is a measure of the apparent volume of washing solution which remains in the filter cake versus the amount which passes through the cake.) For example, with as much as 31,500 ppm of dissolved calcium in the second-stage washing solution, we have found only 200-300 ppm of calcium in the filtrate from the second filtration stage. In that case, the apparent calcium removal efficiency exceeded 99%. This result is believed due to the aforedescribed reaction between calcium chloride in the washing solution and dissolved sodium sulfite in the filter cake. Typically, the washing step in the second filtration stage is implemented at wash ratio less than about 0.7, since this has been found sufficient to usually achieve chloride removal efficiencies of about 97%.

Although the washing step in the second filtration stage is quite efficient in minimizing the concentration of calcium in the second stage filtrate, that filtrate nevertheless may contain an appreciable amount of calcium in absolute terms. That calcium, usually present as calcium chloride and sulfate, constitutes a potential source of calcium sulfate scale in the chloride scrubbing system, especially if there is cake cracking in the aforementioned second filtration stage. (Cracking of the solids cake would allow the washing solution, which has a high calcium chloride content, to bleed through the cake.) To preclude scaling problems, the system preferably includes a softening device 97 wherein soda ash is admixed with the filtrate from the second filtration stage. In the illustrated system, soda ash is conveyed to the softening device 97 by a conduit 85a and filtrate from the second filtration stage is conveyed to the softening device by the conduit 95. In the softening device 97, calcium carbonate solids are formed and then are settled from solution. Normally, the amount of soda ash used at this stage is relatively minimal and sometimes none will be required. Preferably the softening device 97 is a combination contacting-settling device, such as the Reactor-Clarifier units manufactured by the Eimco- BSP division of Envirotech Corporation, Salt Lake City, Utah; however, other conventional softening means could be employed. In the illustrated system, the calcium carbonate solids which are formed and settled in the softening device 97 are conveyed via a conduit 98, either continuously or intermittently, to the stirred-tank reactor 31 as a liquid-solid suspension for mixing with the reactor contents; the clarified liquid from the softening device 97 is conveyed, by a conduit 99, to confluence with the scrubbing solution carried by the recirculation conduit 17. Thus, the scrubbing solution which is employed in the scrubbing device 11 consists essentially of the softened filtrate from the aforementioned second filtration stage and any makeup water which is added. Normally, further reagents need not be added to the chloride scrubbing solution. The makeup water can be added, for example, through a conduit 100 and usually can comprise previously used blowdown or cooling water. The makeup water could, as another example, be introduced directly into the softening device 97 so that the makeup water is softened simultaneously with the filtrate from the second filtration stage.

It should now be appreciated that the chloride scrubbing solution contains the sodium values which would otherwise be discarded with the cake of solids formed in the sodium-base sulfur dioxide scrubbing system. The sodium values in the chloride scrubbing solution are present as sodium chloride thereby directly reducing the hydrogen chloride acidity below that which would exist in the absence of this sodium reclaimed by the second stage displacement washing step from the cake of solids formed in the first filtration stage. It should also be appreciated that chloride ion buildup and salting problems are minimized due to the aforementioned liquid displacement or exchange step in the second filtration stage.

We claim:

1. A system for removing gaseous sulfur dioxide and chloride components from a gas stream comprising:
   a. a first wet-type gas scrubbing device for contacting the gas stream with a circulating aqueous scrubbing solution to absorb chloride components from the gas stream, said first scrubbing device having an inlet for admitting the gas stream, a chamber wherein the gas stream is scrubbed with the circulating aqueous scrubbing solution, and an outlet for discharging the scrubbed gases;
   b. a first reactor means, which is connected to said first wet-type gas scrubbing device to receive a portion of the aqueous scrubbing solution which has contacted the gas stream and which is also connected to receive a neutralizing agent, for mixing the neutralizing agent with the aqueous scrubbing solution;
   c. a second wet-type gas scrubbing device, which is connected to receive the gas stream treated by said first wet-type gas scrubbing device for contacting the received gas stream with a circulating sodium-base scrubbing solution to absorb sulfur dioxide from the gas stream, said second scrubbing device having an inlet for admitting the gas stream, a chamber wherein the gas stream is scrubbed with the circulating sodium-base scrubbing solution, and an outlet for discharging the scrubbed gas;
   d. a second reaction means, which is connected to said second wet-type gas scrubbing device to receive a portion of the sodium-base scrubbing solution which has contacted the gas stream and which is connected to receive an alkali compound, for mixing the alkali compound with the sodium-base scrubbing solution to regenerate active alkali components in the sodium-base scrubbing solution and to form solid precipitates;
   e. filtration means having separate first and second filtration stages;
      (i) said first filtration stage connected to receive reacted products from said second reaction means to separate the solid precipitates and to form a filter cake of solids therefrom;
      (ii) said second filtration state, connected to receive the mixed products from said first reactor means and the cake of solids from said first filtration stage, for washing the cake of solids with the mixed products;
   f. means for conveying filtrate from said first filtration stage to said second wet-type gas scrubbing device to scrub the gases therein; and
   g. means for conveying filtrate from said second filtration stage back to said first wet-type gas scrubbing device to scrub the gases therein.

2. A system according to claim 1 including means connected to convey a liquid portion of the reacted products from said reaction means to said second wet-type gas scrubbing device.

3. A system according to claim 1 further including:
   a. a settling means interposed between said first wet-type gas scrubbing device and said reactor means to receive a portion of the aqueous scrubbing solution which has circulated through said first wet-type gas scrubbing device and to settle solids from said received portion;
   b. means to convey clarified liquid from said settling means to said first wet-type scrubbing device; and
   c. means to convey aqueous slurry from said settling means to said reactor.

4. A system according to claim 1 wherein said filtration means is a horizontal belt vacuum filter.

5. A system according to claim 1 wherein said reaction means comprises a stirred-tank reactor.

6. A system according to claim 5 further including:
   a. a settling means interposed and connected between said stirred-tank reactor and said filtration means to receive reacted products from said stirred-tank reactor and to settle solids from the received products;
   b. means to convey liquid from said settling means to said second wet-type gas scrubbing device; and
   c. means to convey an aqueous slurry of the settled solids from said settling means to said first filtration stage.

7. A system according to claim 6 wherein said settling means is interposed and connected to receive the filtrate from said first filtration stage.

8. A system according to claim 7 including means connected to convey the reacted products from said reaction means to said settling means.

9. A system according to claim 1 further including:
   a. a softening means, which is interposed between said first wet-type gas scrubbing device and said second filtration stage and which is connected to receive the filtrate from said second filtration stage and a softening compound, for reacting the filtrate with the softening compound; and b. means to convey the softened filtrate from said softening means to said first wet-type gas scrubbing device.

10. A system according to claim 9 further including means to convey liquid-solids suspension from said softening means to said reactor means.

11. A system according to claim 10 wherein said softening means is a combination contacting-settling device.

12. A process for removing gaseous sulfur dioxide components and chloride components from a gas stream containing those components comprising:
   a. passing a gas stream into and through a first scrubbing zone and there contacting the gas stream with a circulating aqueous scrubbing solution capable of absorbing chloride components from the gas stream;
   b. treating a portion of the aqueous scrubbing solution which has contacted the gas stream with a neutralizing agent to raise the treated portion to above about pH 2.0;
   c. passing the gas stream into and through a second scrubbing zone subsequent to said first scrubbing zone and there contacting the gas stream with a circulating sodium-base scrubbing solution capable of absorbing sulfur dioxide components from the gas stream;
   d. treating a portion of the sodium-base scrubbing solution which has contacted the gas stream with an alkali compound to regenerate the active alkali components of the sodium-base scrubbing solution and to form solid precipitates in liquid suspension;
   e. in a first filtration stage, filtering the solid precipitates from the liquid suspension to form a cake of solids and returning the filtrate to said second scrubbing zone; and
   f. in a second filtration stage, washing the cake of solids with the treated aqueous scrubbing solution and returning the filtrate to said first scrubbing zone to commingle with the circulating aqueous scrubbing solution therein.

13. A process according to claim 12 wherein said alkali compound is a calcium compound.

14. A process according to claim 13 wherein said alkali compound is selected from the group consisting essentially of calcium hydroxide and calcium oxide.

15. A process according to claim 14 wherein the amount of calcium compound is sufficient to form dissolved sodium sulfite, which is the active alkali component of the sodium-base scrubbing solution, and to form calcium sulfite, which is the solid precipitate in the liquid suspension, with the alkalinity of the liquid ranging from about pH 9 to about pH 12.

16. A process according to claim 13 wherein said circulating sodium-base scrubbing solution contains sodium sulfite.

17. A process according to claim 16 wherein washing in said second filtration stage is accomplished at wash ratios ranging from about 0.4 to about 1.2.

18. A process according to claim 17 including the step of washing the cake of filter solids in said first filtration stage with fresh water.

19. A process according to claim 16 wherein washing in said second filtration stage is accomplished at wash ratios less than about 0.7.

20. A process according to claim 16 wherein washing in said second filtration stage is accomplished at wash ratios less than about 1.2.

21. A process according to claim 16 including the intermediate step of treating the filtrate from said second filtration stage with a softening compound to reduce calcium hardness of the filtrate and then conveying the softened filtrate to said first scrubbing zone.

22. A process according to claim 16 wherein the amount of neutralizing agent utilized to treat the aqueous scrubbing solution is sufficient to raise the pH of the treated portion to at least between pH 2.0 and pH 7.

23. A process according to claim 16 wherein the amount of neutralizing agent utilized to treat the aqueous scrubbing solution is sufficient to raise the pH of the treated portion to between pH 5 and pH 6.

* * * * *